ions, having a drive shaft at least partially supported
United States Patent

Halibrand

[15] 3,691,862

[45] Sept. 19, 1972

[54] TRANSMISSION

[72] Inventor: Henry T. Halibrand, 6469 Nancy St., Los Angeles, Calif. 90045

[22] Filed: Nov. 15, 1968

[21] Appl. No.: 776,068

[52] U.S. Cl. ................................................. 74/379
[51] Int. Cl. ................................................ F16h 3/14
[58] Field of Search .............................. 74/378, 379

[56] References Cited

UNITED STATES PATENTS

| | | | |
|---|---|---|---|
| 686,178 | 11/1901 | Wilson | 74/379 X |
| 757,331 | 4/1904 | Mead | 74/374 X |
| 1,363,044 | 12/1920 | Johnson | 74/379 |
| 1,983,835 | 12/1934 | Barton et al. | 74/379 |
| 2,022,436 | 11/1935 | Schauer et al. | 74/378 X |
| 2,749,766 | 6/1956 | Blair | 74/379 |
| 3,154,047 | 10/1964 | Casale | 74/379 X |
| 2,091,557 | 8/1937 | Montgomery | 74/378 |

*Primary Examiner*—Carlton R. Croyle
*Assistant Examiner*—Thomas C. Perry
*Attorney*—Jeffers & Young

[57] ABSTRACT

A transmission, such as the V-type marine transmissions, having a drive shaft at least partially supported by a driven shaft within a gear box having a freely rotatable drive gear, an idler gear and a driven gear operatively arranged with a coupler on the drive shaft to be normally stationary in a neutral position of the coupler co-rotative in another and counter-rotative in still another position of the coupler.

8 Claims, 7 Drawing Figures

PATENTED SEP 19 1972

INVENTOR by JEFFERS & YOUNG
Attorneys

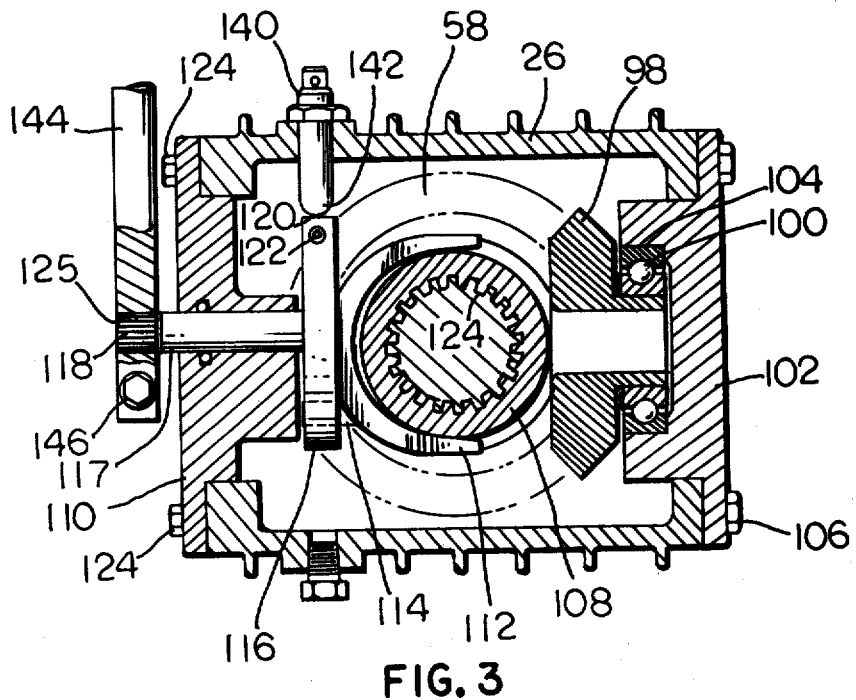
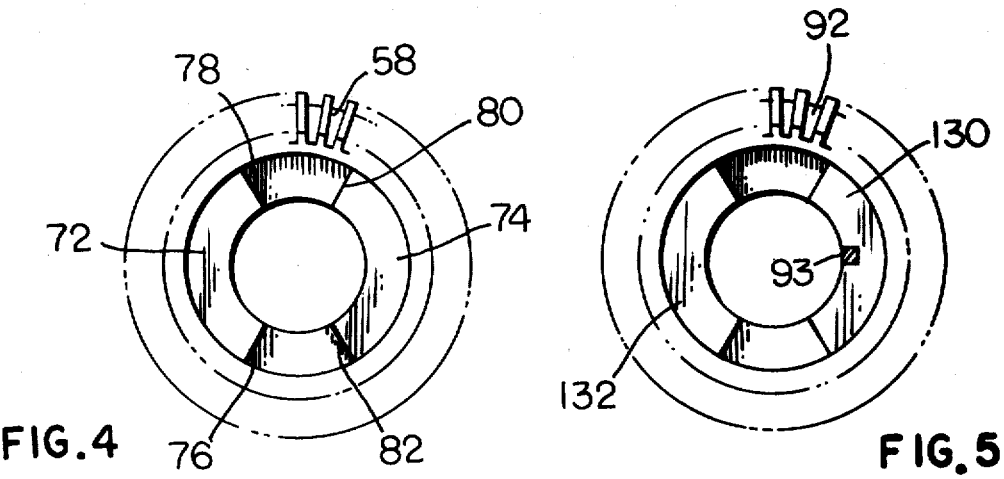
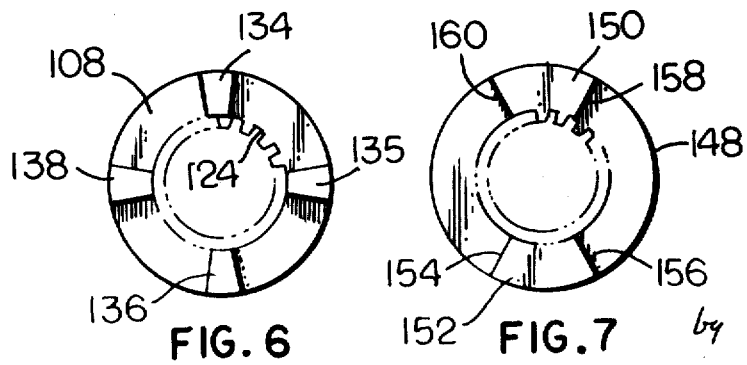

3,691,862

TRANSMISSION

Summary

As has been stated in U.S. Pat. No. 3,154,047 the trend in power boats in recent years has been to orient the mass of the boats powerplant and the drive means such that high speed planing is not thereby interfered with; and that such powerplant location has brought to the art the use of V-drives.

However, the V-drives that have been devised prior to this invention have been complicated in their design; noisy in operation and in need of frequent maintenance because of the continuous running of the entire gear train when the powerplant was operating.

It has also been previously maintained by prior designers that such V-drive transmissions required shaft support means within the gear box that involved several bearing types which have also added to the servicing requirements of the transmission.

It has still further been noted that such prior art transmissions have utilized coupler designs which have limited contact area (dogs) for engaging the gear means. This has presented localized force transmission points leading to undue wear and still further life reduction or more frequent maintenance than is desirable or reasonable to expect from the class of users to which this invention pertains.

This invention, therefore, has as its principal object the improvement of V-transmissions by means that eliminate the above problems.

More particularly, this invention has as its prime object the structuring of a gear box for a V-drive type transmission with means to couple a drive shaft to a driven shaft that does not entail any rotation of gears until positive coupling is effected.

Another object is to provide such a V-drive transmission with space support means for the drive shaft inclusive of support by a stub driven shaft to limit the use of bearings to a minimum.

A still further object of this invention is to provide a coupler with dogs of a polygonal coupling surface to distribute coupling forces more positively and less locally than with prior art devices.

DESCRIPTION OF THE DRAWINGS

Other objects and advantages will appear to those skilled in the art from the following description of the drawings in which:

FIG. 3 is a cross-sectional view along lines 3—3 of FIG. 2;

FIG. 4 is an end view of a freely rotating bevel gear for the drive shaft showing coupler provisions thereof;

FIG. 5 is an end view of a bevel gear keyed to the driven shaft and showing its coupler provisions;

FIG. 6 is an end view of the coupler of preferred design showing a plurality of keystone shaped coupler dogs; and, FIG. 7 is an end view of a modified coupler having two wide area keystone shaped coupler dogs for maximum strength and mass.

DETAILED DESCRIPTION OF THE DRAWINGS

Figure 1:
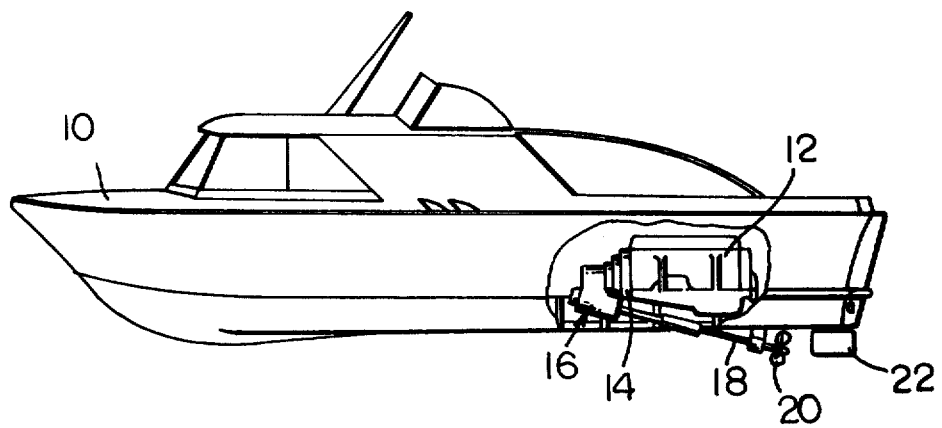
FIG. 1 is an illustration of a power boat having a portion of its hull broken away to illustrate its powerplant and drive means employing the principles of this invention.

With reference to FIG. 1, there is shown a boat 10 of a cabin cruiser variety employing a gasoline engine 12 in the afterhull portion. Engine 12 has bolted to its fly wheel housing 14 a V-transmission 16 to which is coupled a prop-shaft 18 for a propeller 20 exteriorly of the boat hull in front of a rudder 22.

Figure 2:
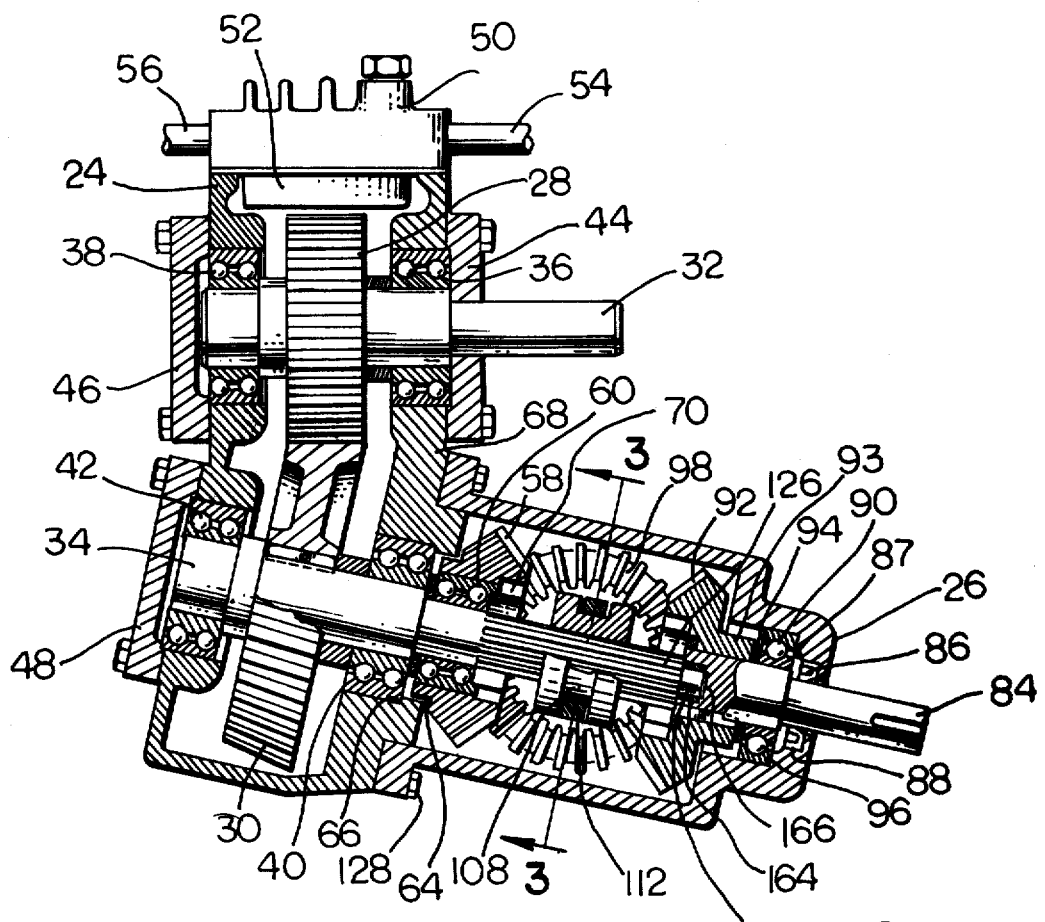
FIG. 2 is a cross-sectional side view of the V-drive transmission of FIG. 1 employing a gear box in accordance with this invention.

The V-transmission is detailed by FIG. 2 and includes a drive gear housing 24 and a gear box housing 26. The drive gear housing has, preferably, laterally extending flanges for motor mount provisions to fix engine 12 and transmission 16 in the boat 10. Housing 24 is constructed to provide an oil sump for drive gears 28 and 30 assembled therein to an input shaft 32 and a drive shaft 34 supported by roller bearings 36, 38, and 40, 42 in the vertical and horizontally spaced walls of housing 24. The bearing openings are closed and sealed by the plates 44, 46, and 48 in regard to bearings 36, 38, and 42 to maintain the integrity for the oil sump provided by housing 24 along the sides thereof.

Housing 24 is closed at its top by a head 50 having heat exchanger fins 52 depending within housing 24 that are cooled by water being circulated within the head 50 from inlet pipe 54 and exhausted via the pipe 56. This provides connection cooling for the oil in housing 24.

A bevel gear 58 is press fitted with a roller bearing 60 and then assembled on shaft 34 to permit the free rotation of gear 58. In order to decrease length of the transmission, the after-body of gear 58 is stepped down, to rotate within the opening in housing 24 having a shoulder 64 for locating bearing 40 and providing a boss 68 for mounting an open end of housing 26. The bevel gear 58 is provided with a socket or coupler recess 70 shown in FIG. 4, as two slots 72 and 74 (FIG. 4) of arcuate shape to provide abutment surfaces 76, 78, 80, and 82.

Next the gear box housing 26 is fitted with a stub driven shaft 84 after a seal 86 is placed in recess 87 about an opening 88 in its forward end. The stub driven shaft is pre-assembled with a roller bearing 90 and a bevel gear 92 keyed thereto by a key 93 with, if desired, a plate bearing 94 therebetween, and then assembled and fixed in the housing 26 to have bearing 90 abutting a shoulder 96 inwardly of the seal recess 87.

A bevel type idler gear 98 is then pre-assembled to a bearing 100 (See FIG. 3) and affixed to a plate 102 having a bearing recess 104 and then inserted from the side of housing 26 to mesh gears 98, 58 and 98, 92. The gear is held in position by being affixed to housing 26 through bolts 106 which secure plate 102 in place on housing 26.

Next a coupler 108 is assembeled to a plate 100 (see FIG. 3) by means of a shifter fork 112 and its eccentric pivot shaft 114 fitted within an opening in a lever arm 116 on a shaft 117 having a splined end 118. The shaft 116 is supported by an opening through plate 110 provided with machined surfaces. Lever arm 116 is provided with three recess areas, such as recessed areas 120 and 122 at its upper end. Plate 110 is then bolted by bolts 124 to the side of housing 26. The coupler is aligned with the axis of the stub shaft 84 such that, upon assembly of housing 26 over boss 68, the splined opening of the coupler will slide onto splined end 126 of the drive shaft 34.

Since the gear 98 and the shifter mechanism are assemblable from the sides of housing 26, these components may be installed after joining of housing 26 by bolts 128 to housing 24.

The bevel gear 92, has coupler recesses or sockets 130 and 132 (FIG. 5) with abutment faces for coupler keystone shaped dogs 134, 136, 138 and 140 (FIG. 6) on the front and rear faces of coupler 108. The drive dogs are so assembled prior to the mating of drive gear housing 24 with housing 26, and therefore the idler gear and coupler mechanism may be removed as a unit for repair and maintenance.

The assembly of the V-transmission is completed by threading a spring detent assembly 140, having a spring urged detent 142, to housing 26 to be biased into one or the other of the recesses in lever arm 116 until a definite load is presented to resist movement of lever arm 116. Finally, a link 144 is clamped by bolt 146 to the splined end 118 of lever arm shaft 117 to provide control of coupler 108 from a remote control station in the boat 10.

With reference to FIG. 7 there is shown a modified coupler 148 having two wide area keystone shaped projections 150 and 152 for each of its faces so that coupler abutment surfaces 154, 156, 158 and 160 have a large mass for sure force transmission from shaft 34 to either gear 58 or gear 92 within the arcuate recesses thereof.

OPERATION

In operation engine 12 drives input shaft 32 causing it to rotate and, via the drive gears 28 and 30, the drive shaft 34. As the spindle end 162 of the drive shaft is supported by sleeve bearing 164 in socket 166 of the stub driven shaft 84, within which it is placed, upon assembly of gear box housing 26 to drive gear housing 24, the stub driven shaft 84 does not rotate with shaft 34. Coupler 108 is normally in the neutral position shown in FIG. 2 and lever arm 116 holds it there due to detent 142 in its recess 120, and coupler 108 rotates with the shaft 34.

When the boat operator decides to go forward he moves his transmission gear selector to rotate lever arm lifting detent 142 by the surface of arm 116 until it drops into recess 122. This translates coupler 108 until its keystone shaped dogs engage appropriate abutment surfaces of bevel gear 92. This positively links shafts 34 and 84 for co-rotation and the boat is propelled forwardly.

For reverse operation the operator similarly moves his transmission selector in the opposite direction until detent snaps into a recess (not shown) to shift coupler 108 until its dogs on the opposite face slip in the recesses of gear 58, positively locking the coupler with gear 58. This drives the shaft 84 in an opposite or counter-rotation manner with respect to shaft 34 in that the shafts are linked via the gear 58, idler gear 98, gear 92 to shaft 84.

It should be noted that with the shifter in its neutral position none of the gears rotate. This means not only less wear, but a better opportunity to effect shifting, since with nonrotatable gears there is less clash opportunity and greater ease to effect clutch operation from vertical to drive position and also to effect a change from forward to reverse or reverse to forward positions. Thus, wear is held to a minimum and gear operation is facilitated.

Having fully described an operative construction of this invention, it is now desired to set forth the intended protection sought by these Letters Patent by the appended claims.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. A V-drive transmission comprising:
An input shaft;
An output shaft having a first gear rotatable therewith to communicate driving force thereto, said input shaft being angularly disposed with respect to said output shaft and projecting in the same direction;
a solid cross section drive shaft having a longitudinal axis with a stepped diameter forming a gear locating means along such longitudinal axis, a driveable gear connection to said input shaft, means for rotatably supporting said drive shaft to provide for freely rotatable movement of said drive shaft with respect to said output shaft, said drive shaft having a splined portion between the ends thereof;
a second gear means including a bearing mounting and coacting with the locating means of said drive shaft to define the longitudinal position of said second gear means on the longitudinal axis of said drive shaft and to provide free relative rotation of said second gear means on said drive shaft;
a transfer gear operatively interconnecting said first and second gears;
coupler means mounted on said drive shaft and operatively driven by the splined portion thereof, said splined portion providing for longitudinal movement of said coupler means relatively to said drive shaft, said coupler means having a neutral position wherein said drive shaft and output shaft are decoupled and thereby severing power communications between said input shaft and output shaft and wherein said first and second gears and transfers gears are relatively stationary, said coupler means being slidably movable into a direct coupling first position with said first gear means to effect a direct drive connection between said drive shaft and output shaft through said first gear means, and a second coupling position of said coupler means in direct coupling position with said second gear means to effect a counter-rotation of said output shaft through said second gear means, said transfer gear means and said first gear means; and,
a housing providing an oil sump for said gear means.

2. The structure in accordance with claim 1, including a plate affixed to an opening in the side of said housing to provide for removal of said transfer gear from the side of said housing.

3. The structure in accordance with claim 1, wherein said first and second gears have facing sockets and said coupler means includes dogs adapted for mating with said facing sockets.

4. The structure in accordance with claim 3, wherein said coupler means comprises a collar intermediately grooved to receive a fork connected eccentrically to an operator-operated lever means having a plurality of recess means cooperating with spring detent means to hold said collar in forward, neutral and reverse drive positions for said transmission.

5. The structure in accordance with claim 3, wherein each of the faces of said first and second gears has at least two keystone shaped dogs.

6. A transmission in accordance with claim 5 including means for remotely operating said coupler means whereby said output shaft is controllably operated in the direction of rotation thereof.

7. The transmission in accordance with claim 6, wherein said coupler means is normally rotatable with said drive shaft and the decoupled relation with said first and second gears.

8. A V-drive transmission in accordance with claim 1 including a first housing having horizontal openings with bearing means and angular openings with aligned bearing means, and a gear box housing affixed to said first housing and enclosing the drive shaft and said output shaft.

* * * * *